358-69. OR 3,283,064 SR

T 6532

SEARCH ROO

Nov. 1, 1966 B. H. J. CORNELISSEN ETAL 3,283,064

CIRCUIT ARRANGEMENT FOR USE IN A COLOR TELEVISION RECEIVER

Filed Sept. 10, 1963 3 Sheets-Sheet 1

INVENTORS
BERNARDUS H.J. CORNELISSEN
HENDRIK BREIMER
BY
Frank R. Jifani
AGENT

INVENTORS
BERNARDUS HJ. CORNELISSEN
HENDRIK BREIMER
BY
Frank R. Jifari
AGENT

Nov. 1, 1966 B. H. J. CORNELISSEN ET AL 3,283,064

CIRCUIT ARRANGEMENT FOR USE IN A COLOR TELEVISION RECEIVER

Filed Sept. 10, 1963 3 Sheets-Sheet 3

INVENTORS
BERNARDUS H.J. CORNELISSEN
HENDRIK BREIMER
BY
Frank R. Jerfani
AGENT

United States Patent Office 3,283,064

Patented Nov. 1, 1966

3,283,064

CIRCUIT ARRANGEMENT FOR USE IN A COLOR TELEVISION RECEIVER

Bernardus Henricus Jozef Cornelissen and Hendrik Breimer, Emmasingel, Eindhoven, Netherlands, assignors to North American Philips Company, Inc., New York, N.Y., a corporation of Delaware Filed Sept. 10, 1963, Ser. No. 307,871
Claims priority, application Netherlands, Sept. 12, 1962, 283,157
6 Claims. (Cl. 178—5.4)

The invention relates to a circuit arrangement for use in a color television receiver of the type comprising an indexing tube having a single gun for producing an electron beam and a display screen composed of groups of color strips, run-in strips and indexing strips. Such receivers also include means for preventing the intensity of the electron beam from dropping below a given minimum value during a horizontal deflection, means for producing a run-in signal and an indexing signal during the scan of the run-in strips and the indexing strips respectively by the electron beam, and means for converting an indexing signal into a switching signal.

In modern indexing tubes, in which the frequency $f_1$ of the indexing signals is $1/k$ ($k$ is a fractional number) times the frequency $f_s$ of the switching signal on which the color signals are modulated prior to the supply to the control-electrode of the indexing tube (i.e., $f_1=(1/k)\cdot f_s$) it is necessary to have a dividing circuit available for dividing the frequency $f_1$ of the indexing signal.

Since the phase of the divided signal is arbitrary, it is necessary to start the dividing circuit in the correct phase.

The dividing circuit in a color television receiver is started at the beginning of each horizontal deflection of the electron beam, when it scans the run-in strips. However, if after the start of the dividing circuit, during a horizontal deflection, the electron beam is completely suppressed due to black parts of the image to be reproduced, the indexing signal disappears, so that the dividing circuit ceases to operate. If subsequently, during the same horizontal deflection the electron beam reappears, an indexing signal is again produced. The dividing circuit may start again, but in an arbitrary phase, so that color errors may be introduced. If it does not restart, no color signal can be reproduced for the remaining part of the horizontal deflection concerned.

It is therefore strictly necessary that the indexing signal should not disappear after the start of the dividing circuit. This can be achieved by not completely suppressing the electron beam, apart from short suppression periods of the electron beam, for example due to negative excursions of the switching signal. Such short suppression periods cannot cause the dividing circuit to cease operating because of the fly-wheel effect of the dividing circuit produced by the integrating action of the tuned circuits included therein.

It will be obvious, however, that the contrast of the image to be reproduced is reduced by these measures, since the control cannot be carried out between a maximum beam current and a zero beam current, but only between a maximum value and a minimum value. It is therefore required to minimise this minimum value.

According to the present invention, however, a considerable improvement can be achieved by providing the arrangement with further means to raise the intensity of the electron beam to a considerably higher value at least for part of the time of scanning of the run-in strips than the minimum value of the intensity during the remaining part of the horizontal deflection.

The resultant improvements are the following:

(1) It is guaranteed that the dividing circuit starts in the correct phase under all conditions, while the signal-to-noise ratio is improved.

(2) The amplification in the run-in channel during the scan of the run-in strips may be lower, so that the requirements for the attenuation in the channel during the scan of the indexing strips may be less severe.

(3) The minimum value of the beam current during the scan of the index strips is no longer determined by the requirements of a stable start of the dividing circuit, so that the contrast of the image to be reproduced is enhanced.

(4) If in a so-called rapid switching the switching signal occurs already during the scanning of the run-in strips, the risk of cross-talk is reduced.

A few possible embodiments of arrangements according to the invention will now be described with reference to the accompanying drawings, in which FIG. 1 is a graph for explaining the starting principle of a dividing circuit used in a color television receiver.

Figures 1, 2:
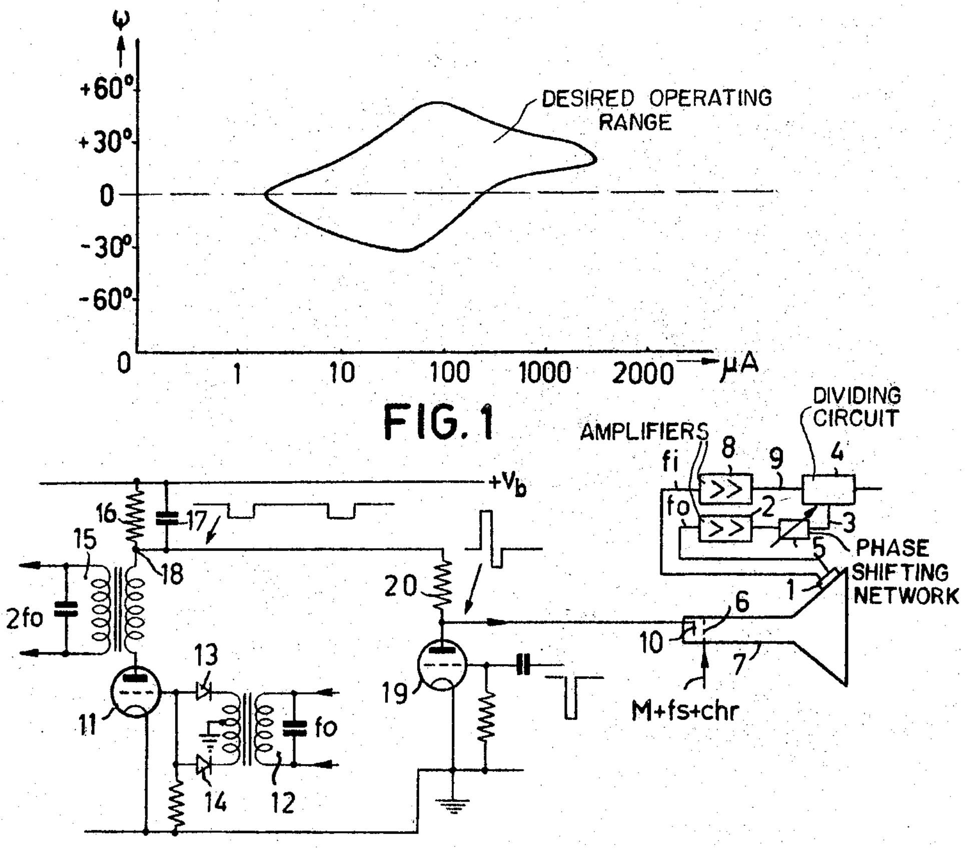
FIG. 2 shows a first embodiment of an arrangement for producing the desired control-voltage for the electron beam.

As is described in application Serial No. 307,916, filed September 10, 1963, a dividing circuit as used in a color television receiver comprising an indexing tube for the reproduction of a color signal can start in a number of phases equal to the dividend. For a dividend $m$ the arbitrary phase $\psi$ is fixed by:

$$\psi=2/K\pi m \text{ with } K=0, 1, 2, 3 \ldots (m-1)$$

From the foregoing formula it follows that the difference between two successive phases, in which a dividing circuit can start, amounts to $2\pi/m$ radians. Consequently, as long as the difference in phase $\psi$ between the signal obtained from the run-in strips and the signal produced in the dividing circuit with the same frequency as the run-in signal owing to the supply of the signal obtained from the indexing strips, remains below half the aforesaid phase difference of $2\pi/m$ radians (i.e. $\psi<\pi/m$), the dividing circuit will invariably start in the same phase. In this case the phase of the switching signal is fixed and a satisfactory reproduction of the color signals modulated on the switching signal is guaranteed.

The phase difference $\psi$ depends upon the intensity of the electron beam at the instant of striking the run-in and indexing strips. This is plotted in FIG. 1 which is measured as follows. In the run-in channel, in which the run-in or starting signal with the frequency $f_0$ is derived from the photomultiplier 1 and supplied via the amplifier 2 to the input terminal 3 of the dividing circuit 4, there is arranged a phase-shifting network 5 (see FIG. 2; it is assumed here by way of example that the run-in and indexing strips emit ultraviolet light at the incidence of the electron beam. The arrangement is, however, identical, when use is made of run-in and indexing strips having a high secondary emission coefficient). By varying the phase shift of the starting signal in the run-in channel with the aid of the phase-shifting network 5, it can be assessed which phase shift $\psi$ is admissible before the dividing circuit 4 starts in a different phase.

From the above requirement that $\psi$ should be lower than $\pi/m$, it follows that with $m=3$ the dividend with which the measurement is carried out the admissible phase shift can never exceed about $\pi/3$=about 60°. Since the spot size varies with a varying beam current, and also due to the inhibiting effect of the photomultiplier 1, the influence of which on the phase of the signal of the frequency $f_1$ differs from that on the phase of the signal of the frequency $f_o$, the permissible phase shift in practice is, however, always smaller than about 60°.

From FIG. 1 it will be seen that with beam currents of less than 1$\mu$A the phase angle $\psi$ can hardly be varied without the dividing circuit starting in a different phase. With beam currents exceeding 1$\mu$A the permissible angle $\psi$ increases gradually. With a beam current of about 10$\mu$A a variation up to about −18° on one side and up to about +20° on the other side is possible before the dividing circuit starts in a different phase.

With a beam current of about 100$\mu$A the permissible angle attains its maximum value; the divider starts in a different phase with an angle $\psi$=−30° on one side and an angle $\psi$=+51° on the other side.

There occurs in this case, in addition, a certain amount of asymmetry, which continues with higher beam currents, so that with a beam current of about 500$\mu$A in fact only a positive angle $\psi$ is admissible, whereas a negative angle $\psi$ is no longer allowed.

A beam current of about 10$\mu$A suffices for producing an indexing signal during the scan of the indexing strips, which signal is capable of maintaining the operation of the dividing circuit when started. Therefore, the value of 10$\mu$A is the minimum value, below which the beam current must not drop during the scan of the indexing strips, since otherwise the dividing circuit ceases to operate with all consequences described in the preamble. A higher minimum beam current during the scan of the indexing strips, during which scan the image is reproduced, would reduce the contrast of the reproduced image, since the difference between bright white parts and black parts is reduced.

The choice of a constant value of the beam current during the starting period and during the remaining part of the horizontal deflection, which value of about 10$\mu$A is not affected by the brightness signal, has various disadvantages.

Firstly the permissible angle $\psi$ is comparatively small (see FIG. 1) and due to changes of the indexing tube, for example due to ageing, or due to variations in the supply voltage the beam currents are likely to assume values lower than 10$\mu$A, so that the permissible angle $\psi$ is further reduced. This involves the risk of starting in a different phase and of a resultant erroneous color reproduction. When a beam current of a substantially constant value of about 100$\mu$A to 200$\mu$A is chosen during the start, these disadvantages are considerably mitigated. The permissible angle $\psi$ is then much larger and, moreover, with variations in the beam current the permissible angle $\psi$ will vary much less, which is evident from the flat course of the graph of FIG. 1 around said beam currents.

Secondly with a beam current of about 10$\mu$A the signal-to-noise ratio or, in other words, the signal-to-interference ratio is very unfavorable, so that weak noise or interference components may cause the dividing circuit to start in an erroneous phase. After the start of the dividing circuit this effect is considerably less important, since due to the flywheel effect of the dividing circuit only high noise or interference pulses are capable of disturbing the dividing process.

It will appear that the values of the beam current given above and the associated, permissible angles $\psi$ are to be considered only as examples. With other types of indexing tubes other values will be used, but the tendency of the choice in accordance with the invention remains the same, i.e. a comparatively high beam current during the start of the dividing circuit and a low minimum value, below which the beam current must drop during the remaining part of a horizontal deflection.

From the foregoing the improvements referred to in the preamble under (1) and (3) will be obvious.

The advantage referred to under (2) may be explained as follows:

After the dividing circuit has started at the beginning of a horizontal deflection, the starting signal, which is supplied to the input terminal 3 of the dividing circuit 4, must be suppressed as far as possible during the remaining part of said horizontal deflection. If this signal is not suppressed, a signal of the frequency $f_o$ will prevail also during the scan of the indexing strips. This signal is then modulated by the color signal, so that it has quite an arbitrary phase, and the dividing process is thus disturbed.

Assume, for example, $f_1$=12 mc./s., $f_o$=4 mc./s. and $f_s$=8 mc./s., and the color signal is modulated on the switching signal $f_s$=8 mc./s. (the signal $M+f_s+chr$ is applied to the Wehnelt cylinder 6 of the indexing tube 7 (see FIG. 2), in which M designates the monochrome signal containing the brightness information of the image to be reproduced and $f_s+chr$ denotes the switching signal with the color signal modulated thereon). The beam scanning the indexing strips is modulated with the color signal, so that the component of 8 mc./s. modulated by the color signal is multiplied by the signal of the frequency $f_1$=12 mc./s. Therefore a component of 4 mc./s. is produced, which is modulated with the color signal and which is passed, without additional measures, by the amplifier 2, tuned to the frequency $f_o$=4 mc./s.

If $f_o$=8 mc./s., the same objections apply, since $f_s$ also equals 8 mc./s. and since the index pattern, subsequent to scanning, provides a sequence of pulses containing a direct-current component, it supplies, together with the 8 mc./s. component of the switching signal again a signal capable of passing the amplifier 2, so that the dividing process is adversely affected.

From the foregoing it is apparent that the amplifier 2 must be cut off after the dividing circuit has started.

If during the start a low beam current of say 10$\mu$A is used, the amplifier 2 must have a higher amplification factor in order to be able of supplying a starting signal of the required amplitude to the input terminal 3 than in the case in which a higher beam current of say 200$\mu$A is used. Apart from the fact that in the first case the amplifier 2 must have a higher amplification factor, so that it is more costly, the requirement of suppression in the amplifier 2 during the scan of the indexing strips is more severe. With a beam current of 10$\mu$A, for example, the suppression must amount to 24 db and with a beam current of 200$\mu$A only 6 db. The suppression means are therefore simpler and/or the required voltage may be of lower value.

The advantage mentioned under (4) in the preamble may be explained as follows:

A satisfactory dynamic behavior requires a minimum overall transit time of the loop from the photomultiplier 1 to the Wehnelt cylinder 6. However, a short transit time involves the possibility that the switching signal of the frequency $f_s$=8 mc./s. is supplied to the Wehnelt cylinder 6 before the termination of the scan of the run-in strips. The number of run-in strips cannot be reduced to an extent such that this possibility is excluded, however, since in this case a satisfactory start of the dividing circuit is not always ensured. It is furthermore desirable that during the scan of the indexing strips not only a signal of the frequency $f_o$ but also a signal of the frequency $f_1$ should be reproduced. The first signal, the starting signal proper, is fed via the amplifier 2, tuned to the frequency $f_o$, to the input terminal 3 of the dividing circuit 4. The second signal, the signal of the frequency $f_1$, is also fed during the scan of the run-in strips via the amplifier 8 to a second input terminal 9 of the dividing circuit 4. If the two signals are not simultaneously supplied during the scan of the run-in strips, there is the possibility that the starting signal of the frequency $f_0$ has disappeared before the signal of the frequency $f_1$ has well started the dividing circuit, so that a smooth start is obtained.

From the run-in pattern is not therefore derived both a signal of the frequency $f_0=4$ mc./s. or 8 mc./s. and a signal of the frequency $f_i=12$ mc./s., the latter signal derived directly from the run-in pattern being termed the desired signal.

If the starting signal derived from the run-in strips has a frequency $f_0=4$ mc./s., it will form with the already available switching signal of the frequency $f_s=8$ mc./s. an undesirable signal of a frequency $f_i=12$ mc./s., on which the color signals are modulated and which reaches the input terminal 9 via the amplifier 8. This undesirable signal disturbs the correct phase of the signal obtained from the dividing circuit 4 so that color errors may result therefrom. The color error decreases with increases in the amplitude of the desired signal with respect to the amplitude of the undesirable signal of the frequency $f_i=12$ mc./s. or in other words the color error is reduced when the ratio $$\frac{I_{12}\text{ desired}}{I_{12}\text{ undesirable}}$$

is increased.

$I_{12}$ desired$=I_{=}\times S_{12}$, wherein $I_{=}$ is the D.C. component of the beam current during the scan of the run-in strips and $S_{12}$ is the component of the frequency of 12 mc./s., which is supplied by the run-in pattern, when scanned by an unmodulated electron beam.

$I_{=}$ increases as the beam current assumes a higher constant value during the scan of the run-in strips.

The ratio $$\frac{I_{12}\text{ desired}}{I_{12}\text{ undesirable}}=\frac{I_{=}\times S_{12}}{I_8\times S_4}$$

thus becomes higher, and hence cross-talk is reduced as $I_{=}$ becomes higher with respect to $I_8$. This can be achieved by giving the beam current a comparatively high value during the scan of the run-in strips, as described above.

It will be obvious that this effect can be increased not only by increasing the ratio of $I_{=}/I_8$ but also by increasing the ratio $S_{12}/S_4$. The latter can be achieved by composing the run-in pattern as follows: In principle, the relative distance between the run-in strips is made equal to that of the indexing strips, but one of three run-in strips is omitted. A Fourier analysis of the run-in signal (starting signal) from such a run-in pattern shows that the amplitude of the component of the frequency $f_i=12$ mc./s. ($S_{12}$) has approximtaely twice the value in the case in which two of each group of three run-in strips of the run-in pattern are omitted. Since in both cases the amplitude of the component of the frequency $f_0=4$ mc./s. maintains approximately the same value, the value $S_{12}/S_4$ is greater with the omission of one run-in strip than with the omission of two run-in strips.

It will otherwise be apparent that a signal of the frequency $f_0=8$ mc./s. can be derived from such a run-in pattern, when the amplifier 2 is tuned to the last-mentioned frequency.

Figure 3:
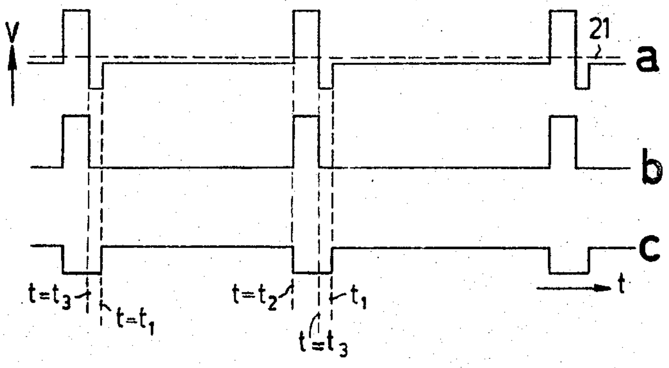
FIG. 3 illustrates voltages produced in the arrangement of FIG. 2.

FIG. 2 also shows an arrangement for obtaining the desired voltage illustrated in FIG. 3*a*, which is supplied to the cathode 10 of the indexing tube 7. The tube 11 of FIG. 2 is a tube of the dividing arrangement, i.e. of that part in which the frequency $f_0$ is doubled, (for a detailed description of this dividing circuit reference is made to copending application Serial No. 307,916 for the case of $m=3$).

The dividing circuit has started correctly, when a sufficiently high signal of the frequency $f_0$ is fed to the circuit 12, which is tuned to said frequency. The frequency of this signal doubled by the two diodes 13 and 14 by double rectification, is amplified in the valve 11 and conducted away via the circuit 15, which is tuned to the frequency $2f_0$.

The anode circuit of the valve 11 includes the parallel combination of a resistor 16 and a capacitor 17. The capacitor 17 shunts the resistor 16 for the frequency $2f_0$.

Due to the double rectification a negative voltage is at the same time produced at the control-grid of the valve 11, which voltage strongly reduces the anode current of this valve. Consequently, the direct voltage across the resistor 16 drops and the voltage at point 18 increases. In other words, at the instant of correct starting of the dividing circuit the voltage at point 18 rises. This is illustrated in FIG. 3*c*, in which $t=t_1$ indicates the instant of starting of the dividing circuit.

The signal of the frequency $f_0$ will be supplied to the circuit 12 during the remaining part of a horizontal deflection, so that the voltage at point 18 maintains the same value for the said period of time. At the termination of this horizontal deflection the electron beam is suppressed, so that the signal fed to the circuit 12 falls out and the valve 11 draws the full anode current. Consequently, the voltage across the resistor 16 rises and the voltage at point 18 drops. This is indicated in FIG. 3*c* for the instant $t=t_2$.

The arrangement comprises furthermore a tube 19 with an anode resistor 20, which is connected in series with the resistor 16. The control-grid of the valve 19 receives negative-going line fly-back pulses originating from the output stage for producing the sawtooth current passing through the horizontal deflection coils (not shown), arranged around the neck of the display tube 7. During the horizontal line fly-back the valve 19 is cut off, so that without the operation of the valve 11 a pulsatory signal is produced across the resistors 16 and 20; this signal is illustrated in FIG. 3*b*. In this figure the period of time from $t=t_2$ to $t=t_3$ corresponds to the line fly-back time.

Since the valves 11 and 19, however, are both operative, the voltage at the anode of the valve 19 will be the sum of the voltages illustrated in FIGS. 3*b* and 3*c*; they will have the waveform shown in FIG. 3*a*.

The voltage shown in FIG. 3*a* is fed to the cathode 10 of the indexing tube 7. By supplying to the Wehnelt cylinder 6 such a fixed bias voltage (apart from the supplied control-signal $M+f_s+chr$) that the beam current is cut-off when the cathode voltage exceeds the value indicated by the broken line 21, it will be obvious that the beam current is zero from the instant $t=t_2$ to $t=t_3$, then from the instant $t=t_3$ to $t=t_1$ it assumes a comparatively high value after which, from the instant $t=t_1$ to $t=t_2$ it has a minimum value, which can be raised only by the control-signal at the Wehnelt cylinder 6. It will furthermore be obvious that by means of the correct values of the resistors 16 and 20 the pulse assumes the correct amplitude during the period of time of $t=t_3$ to $t=t_1$, so that the beam current has the required intensity during the start of the dividing circuit. Since during the start the beam current must neither assume an excessively high value nor an excessively low value, it is desirable to switch off also the monochrome signal M during the start of the dividing circuit.

As a matter of fact the same result may be obtained by inverting the phase of the signal shown in FIG. 3*a* and by supplying it to the Wehnelt cylinder 6.

Figure 4:
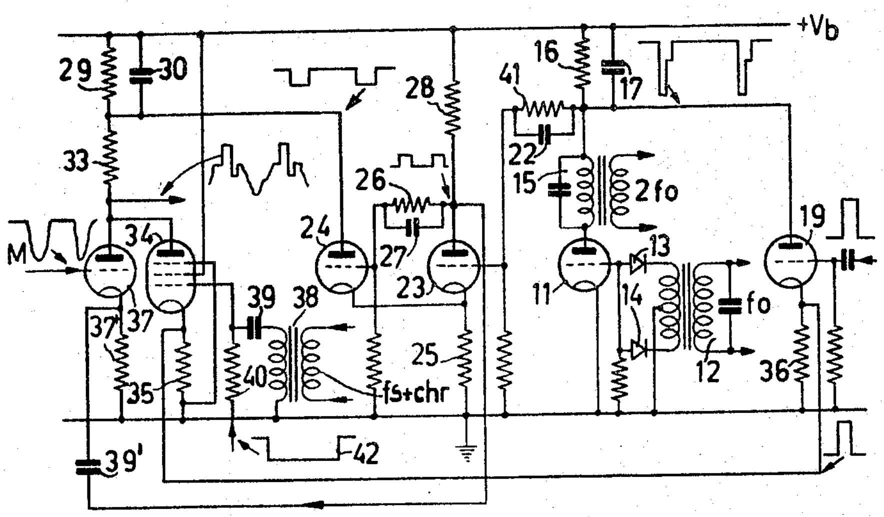
FIG. 4 shows a second embodiment for producing the desired control-voltage with the video information.
Figure 5:
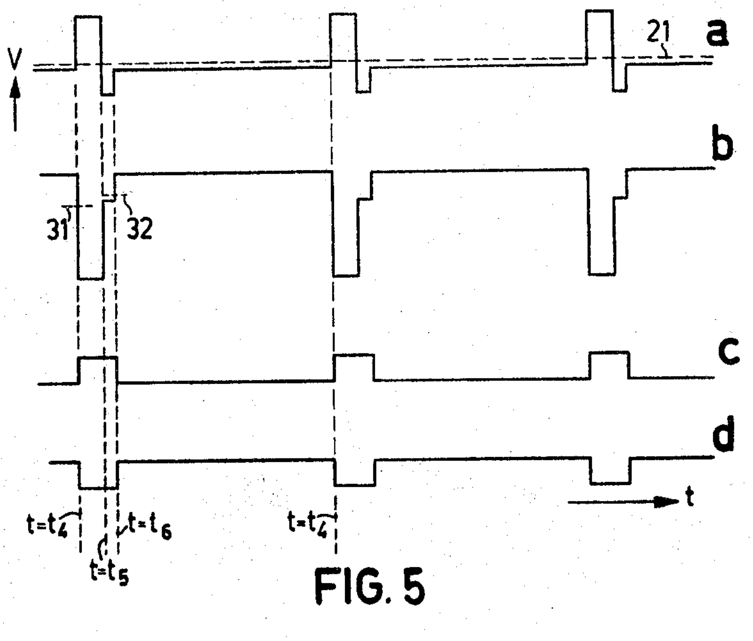
FIG. 5 illustrates voltages produced in the arrangement of FIG. 4.

A further possibility of producing the desired signal is illustrated in FIG. 4. This arrangement comprises again the valve 11 with the circuit elements 12 to 17. However, the valve 19 receives a positive-going fly-back pulse and the resistor 20 is omitted. Since during the fly-back the electron beam in the indexing tube is cut off, the valve 11 and the valve 19 convey full current during this fly-back time, period of time $t_4$ to $t_5$ (see FIG. 5). The maximum voltage drop is produced across the resistor 16 and the voltage at the anode of the valve 19 is at a minimum, which is illustrated in FIG. 5*b* for the period of time from $t=t_4$ to $t=t_5$. After the instant $t=t_5$ the valve 19 is cut off, but the valve 11 continues conveying current. The voltage across the resistor 16 therefore drops, whereas the voltage at the anode of the valve 19 increases. This state is maintained until at the instant $t=t_6$ the dividing circuit has started, so that the current passing through the valve 11 is strongly reduced and the voltage at the anode of the valve 19 rises further. This anode voltage is maintained until at the beginning of the next-following horizontal fly-back the whole cycle is repeated.

The signal produced at the anode of valve 19 is fed via the parallel combination of a resistor 41 and a capacitor 22 to the control-grid of the valve 23. This valve forms part of a bistable trigger circuit, which comprises furthermore a valve 24, a common cathode resistor 25, the parallel combination of a resistor 26 and a capacitor 27, an anode resistor 28 and an anode resistor 29 shunted by a capacitor 30.

The valve 23 is cut off as soon as the anode voltage of the valve 19 passes the level indicated by the broken line 31 in FIG. 5*b* at the instant $t=t_4$, whereas it conveys current again, when said voltage passes the level indicated by the line 32 at the instant $t=t_6$. The anode voltage of the valve 23 thus assumes a waveform as shown in FIG. 5*c*. The valve 24 is controlled in a sense opposite the valve 23, so that its anode voltage assumes the waveform shown in FIG. 5*d*.

The resistor 29, together with the series-connected resistor 33, constitutes the anode resistor of the valve 34. Across the cathode resistor 35 of said valve there is produced a positive-going fly-back pulse, which is developed across the cathode resistor 36 of the valve 19. Thus the anode voltage of the valve 34 becomes as is shown in FIG. 5*a*; this is the same as shown in FIG. 3*a*. The advantage of the use of a trigger circuit consists in that larger amplitudes are attainable than in the arrangement shown in FIG. 2 and also the flanks of the pulses produced are steeper.

The arrangement shown in FIG. 4 comprises furthermore the valve 37, with which the resistor 33 operates as an anode resistor and the resistor 37' as a cathode resistor. The control-grid of the valve 37 receives the monochrome signal M. The monochrome signal is switched off during the horizontal fly-back and during the scan of the indexing strips by applying a pulse from the anode of the valve 23 to the cathode of the valve 37 via the coupling capacitor 39'.

The control-grid of the valve 34 receives via the transformer 38 and the capacitor 39 the switching signal of the frequency $f_s$ and the color signal modulated thereon ($f_s+chr$). The interconnected anodes of the valves 34 and 37 have produced at them a signal which can be supplied subsequent to phase inversion to the Wehnelt cylinder 6 of the indexing tube 7.

A vertical fly-back pulse 42 is supplied via the leakage resistor 40, so that the electron beam is also suppressed during the vertical fly-back.

It will be obvious that the desired voltages shown in FIGS. 3*a* and 5*a* may be produced in many other ways. Information about the start of the dividing circuit may for example also be derived from a point lying behind the dividing circuit, since the switching signal of the frequency $f_s$ will be available with the correct frequency and amplitude only when the dividing circuit has started.

It is furthermore not strictly necessary to provide a duration of the pulses as shown in FIG. 3*c* from the instant $t=t_2$ to the instant $t=t_1$; it may also have a duration from the instant $t=t_3$ to the instant $t=t_1$, since if such a signal has an adequate amplitude, it may be added to the signal shown in FIG. 3*b* in order to obtain the signal shown in FIG. 3*a*. The same applies to FIG. 5 and the associated arrangement shown in FIG. 4.

Figures 6, 7:
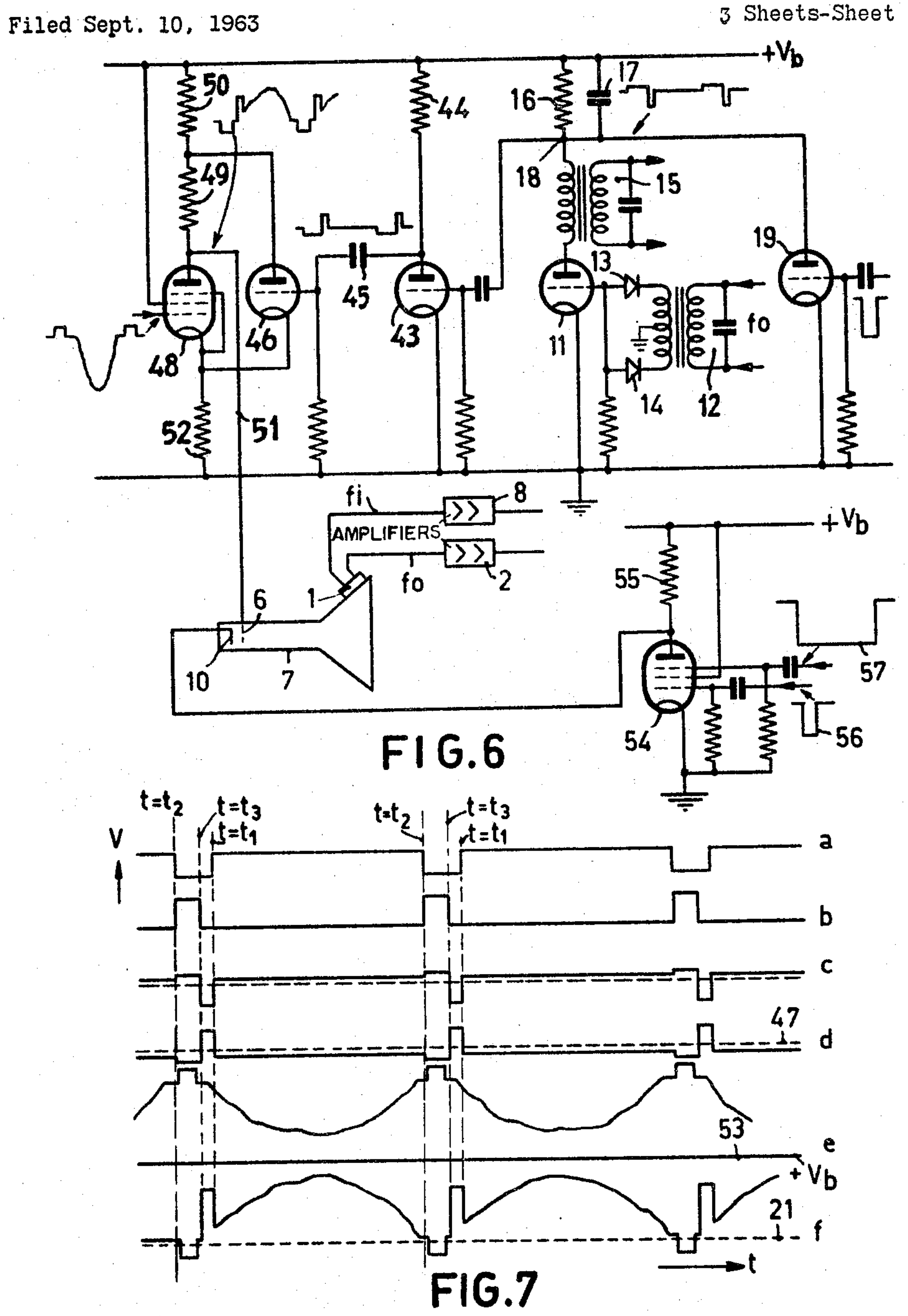
FIG. 6 shows a third embodiment for producing the desired control-voltage with video information.
FIG. 7 illustrates voltages produced in the arrangement of FIG. 6.

A further possibility of producing the desired voltage is illustrated in FIG. 6, in which corresponding parts are designated as far as possible by the same references as in FIG. 2.

In the arrangement shown in FIG. 6, when the valve 19 is left out of consideration, a voltage as illustrated in FIG. 7*a* is produced across resistor 16. A voltage as is illustrated in FIG. 7*b* is produced across resistor 16, solely by the operation of the valve 19. The amplitude of the pulse of the signal shown in FIG. 7*a* is allowed to be at the most equal to that of the pulse shown in FIG. 7*b*. The effect of the two valves produces across the resistor 16 a voltage as is shown in FIG. 7*c*. This voltage is amplified and its phase is inverted in the valve 43 so that the voltage shown in FIG. 7*d* is produced, across the anode resistor 44. This voltage is supplied via the coupling capacitor 45 to the control-grid of the valve 46. Thus the voltage at the control-grid of the valve 46 will fluctuate around the voltage level indicated by the line 47 (se FIG. 7*d*) and the valve will convey current only from the instant $t=t_3$ to the instant $t=t_1$.

The valve 46 is connected partly in parallel with the video output tube 48, the anode of which is connected via the series combination of the resistors 49 and 50 to the supply voltage source and via the conductor 51 to the Wehnelt cylinder 6.

The interconnected cathodes of the valves 46 and 48 are connected to ground via a common cathode resistor 52. The anode of the valve 46 is connected to the junction of the resistors 49 and 50.

To the control-grid of the valve 48 is supplied the total signal $M+f_s+chr$ produced in the receiver; this signal is shown in FIG. 7*e*; for the sake of clarity the switching signal with the modulated color signal ($f_s+chr$) is omitted.

The valve 46 conveys current only from $t=t_3$ to $t=t_1$, so that the resultant voltage across the resistor 52 cuts off the valve 48. The total video signal $M+f_s+chr$ can then not reach the Wehnelt cylinder 6, whilst the anode voltage of this tube increases. This is shown in FIG. 7*f*, in which the signal at the anode of the valve 48 is drawn; it will be seen therefrom that the signal fed to the Wehnelt cylinder 6 contains a pulse for the period of time $t_3 \rightarrow t_1$, the period of starting of the dividing circuit 4, which pulse raises the beam current to a constant, comparatively high value, not affected by the video signal.

Without the connection of the anode of the tube 46 to the junction of the resistors 49 and 50, the peak of the pulse would reach the supply voltage $V_b$ indicated by the line 53 in FIG. 7*f* during the period from $t_3$ to $t_1$. However, in this case the beam current would assume the maximum value during the scan of the run-in strips, which, as follows from the explanation in connection in FIG. 1, is undesirable. However, since the valve 46 conveys current during the said period of time, the peak of the pulse is determined by the voltage drop across the resistor 50. By a suitable choice of the resistors 49 and 50 the desired amplitude of the pulse can be adjusted for the period of time $t_3$ to $t_1$. The line 21 of FIG. 7*f* indicates the cut-off voltage of the indexing tube 7, when the cathode 10 is adjusted to a fixed voltage. The adjustment of this fixed voltage is performed with the aid of the pentode valve 54 and its anode resistor 55. The suppression of the electron beam during the horizontal and the vertical fly-back time is achieved by supplying to the first and the second control-grid of the valve 54 a line-fly-back pulse 56 and 57 respectively.

What is claimed is:

1. In a color television receiving system of the type employing a cathode ray tube having a single electron gun for producing an electron beam and a screen with a picture defining area with a plurality of parallel color strips and indexing strips, and a run-in area with a plurality of run-in strips, whereby said beam scans said run-in area before said picture defining area during the scanning of each line, said system further being of the type including means for producing a run-in signal and an indexing signal when said beam scans said run-in strips and said indexing strips respectively, means for converting said indexing signal to a switching signal, and means for preventing the intensity of said beam from dropping below a predetermined minimum intensity when scanning said picture defining area, whereby said beam always has sufficient intensity that said indexing signal is continuously produced during the scanning of said picture defining area; means for minimizing the value of said predetermined intensity comprising means for increasing the intensity of said beam to a value substantially greater than said predetermined minimum intensity during at least a part of the time said beam scans said run-in area.

2. In a color television receiving system of the type employing a cathode ray tube having a single electron gun for producing an electron beam for scanning a screen, said screen comprising a picture defining area with a plurality of parallel color strips and indexing strips, and a run-in area with a plurality of run-in strips, whereby said beam scans said run-in area before said picture defining area during the scanning of each line, said system further being of the type including means for producing a run-in signal and an indexing signal when said beam scans said run-in strips and indexing strips respectively, divider means for converting said indexing signal to a switching signal, means for applying said run-in signal to said divider means for starting said divider means, and means for preventing the intensity of said beam from dropping below a predetermined minimum intensity when scanning said picture defining area, whereby said beam always has sufficient intensity that said indexing signal is continuously produced during the scanning of said picture defining area; means for increasing the intensity of said beam to a value substantially greater than said predetermined minimum intensity during at least a part of the time said beam is scanning said run-in area of each scanning line, whereby the minimum beam intensity for continuously producing said indexing signal during the scanning of said picture defining area is reduced.

3. The system of claim 2 wherein said means for increasing the intensity of said beam comprises means for producing a pulsatory signal responsive tn an inoperative state of said divider means, a source of flyback pulses, and means for applying said pulsatory signal and flyback pulses to said electron gun, whereby said flyback pulses cutoff said beam and stop the operation of said divider means, and said pulsatory signal increases the intensity of said beam to a value substantially greater than said predetermined minimum intensity between the termination time of each flyback pulse and the time said divider means starts operating again in response to a run-in signal.

4. The system of claim 3 comprising a resistor, means applying said pulsatory signal and flyback pulses to said resistor with unlike polarity, said flyback pulses having an amplitude at least as great as the amplitude of said pulsatory signal, and means for applying the voltage across said resistor to said electron gun, said pulsatory signal having a polarity tending to increase the intensity of said beam.

5. The system of claim 3 wherein said dividing means comprises a first amplifying device having input, output and common electrodes, a source of operating potential having first and second terminals, means connecting said common electrode to said first terminal, a parallel circuit of a resistor and capacitor, means connecting said paralllel circuit between said second terminal and output electrode, and means for applying said run-in signal to said input electrode, whereby said pulsatory signal is produced across said parallel circuit, and mean for applying the voltage across said paralllel circuit to said electron gun.

6. The system of claim 5 comprising a second amplifying device having input, common and output electrodes, moans for applying said flyback pulses to the input electrode of said second device, means connecting the common electrode of said second device to said first terminal, resistor means, and means connecting said resistor means between the output electrodes of said first and econd devices, whereby current from said first and second devices flows through said resistor of said parallel circuit.

References Cited by the Examiner

UNITED STATES PATENTS

| | | | |
|---|---|---|---|
| 2,945,087 | 7/1960 | Graham et al. | 178—5.4 |
| 3,193,618 | 7/1965 | Cornelissen et al. | 178—5.4 |

DAVID G. REDINBAUGH, *Primary Examiner.*

J. H. SCOTT, *Assistant Examiner.*

UNITED STATES PATENT OFFICE

CERTIFICATE OF CORRECTION

Patent No. 3,283,064 November 1, 1966

Bernardus Henricus Jozef Cornelissen et al.

It is hereby certified that error appears in the above numbered patent requiring correction and that the said Letters Patent should read as corrected below.

Column 5, line 7, for "is obtained" read -- is not obtained --; line 8, for "is not therefore" read -- is therefore --; line 24, for "or in" read -- or. In --; line 55, for "approximtaely" read -- approximately --; column 8, line 20, for "(se" read -- (see --; column 9, line 44, for "tn" read -- to --; column 10, line 30, for "moans" read -- means --; line 34, for "econd" read -- second --.

Signed and sealed this 5th day of September 1967.

(SEAL)
Attest:

ERNEST W. SWIDER
Attesting Officer

EDWARD J. BRENNER
Commissioner of Patents